(12) United States Patent
Chen

(10) Patent No.: US 12,436,407 B2
(45) Date of Patent: Oct. 7, 2025

(54) SNAP-FIT STRUCTURE FOR SPECTACLE LENS AND TEMPLE

(71) Applicant: PROHERO GROUP CO., LTD., Tainan (TW)

(72) Inventor: Pen-Wei Chen, Tainan (TW)

(73) Assignee: Prohero Group Co., Ltd., Tainan (TW)

( * ) Notice: Subject to any disclaimer, the term of this patent is extended or adjusted under 35 U.S.C. 154(b) by 221 days.

(21) Appl. No.: 18/178,809

(22) Filed: Mar. 6, 2023

(65) Prior Publication Data
US 2024/0302673 A1   Sep. 12, 2024

(51) Int. Cl.
*G02C 1/02* (2006.01)
*G02C 1/00* (2006.01)

(52) U.S. Cl.
CPC ............... *G02C 1/023* (2013.01); *G02C 1/10* (2013.01)

(58) Field of Classification Search
CPC ... G02C 1/02; G02C 1/04; G02C 1/10; G02C 1/023; G02C 2200/04; G02C 2200/06; G02C 2200/08; G02C 5/02; G02C 5/06; G02C 5/10; G02C 5/22
USPC .......................................................... 351/110
See application file for complete search history.

(56) References Cited

U.S. PATENT DOCUMENTS

| | | | | |
|---|---|---|---|---|
| 6,729,724 B1 * | 5/2004 | Jan | ........................... | G02C 5/10 351/110 |
| 10,197,814 B2 * | 2/2019 | Thorsell | ................... | G02C 1/02 |
| 2013/0278884 A1 * | 10/2013 | Fuchs | ...................... | G02C 1/04 351/140 |
| 2016/0103332 A1 * | 4/2016 | Lin | ........................ | G02C 5/126 351/110 |

(Continued)

FOREIGN PATENT DOCUMENTS

| | | | |
|---|---|---|---|
| DE | 202014103447 U1 * | 9/2014 | ............ G02C 5/146 |
| JP | 3198466 U * | 7/2015 | |

(Continued)

OTHER PUBLICATIONS

R. S. Sodhi et al., Use of Snap-fit Fasteners in the Multi-life-cycle Design of Products, 1999, pp. 160-165 [online], [retrieved Jan. 1, 2025], retrieved from the Internet <URL: https://ieeexplore.ieee.org/stamp/stamp.jsp?tp=&arnumber=765869>. (Year: 1999).*

(Continued)

*Primary Examiner* — James R Greece
(74) *Attorney, Agent, or Firm* — Rosenberg, Klein & Lee

(57) ABSTRACT

The present invention relates to a snap-fit structure for spectacle lens and temple, which comprises a spectacle lens with a buckle hole on a side thereof, and a temple with a lens assembly element. A latching member is pivotally connected in a groove of the lens assembly element. When the spectacle lens and the temple are assembled, the side of the spectacle lens is correspondingly engaged with an embedded opening of the lens assembly element, so that the buckle (Continued)

hole of the spectacle lens is put between an elastic piece and a pressing piece of the latching member, and is coupled with a block of the elastic piece correspondingly. When the spectacle lens is separated from the temple, the pressing piece of the latching member is pressed to deflect the latching member by an angle, so that the elastic piece is separatable from the buckle hole of the spectacle lens.

5 Claims, 5 Drawing Sheets

(56) References Cited

U.S. PATENT DOCUMENTS

| | | | |
|---|---|---|---|
| 2016/0231587 A1* | 8/2016 | Chen | G02C 1/10 |
| 2017/0357104 A1* | 12/2017 | Chen | G02C 5/146 |
| 2018/0210225 A1* | 7/2018 | Chen | G02C 5/146 |
| 2019/0137783 A1* | 5/2019 | Huang | G02C 5/146 |
| 2019/0235272 A1* | 8/2019 | Otra | G02C 5/006 |
| 2024/0045230 A1* | 2/2024 | Tsai | G02C 5/22 |

FOREIGN PATENT DOCUMENTS

| | | | | |
|---|---|---|---|---|
| JP | 3198467 U | * | 7/2015 | |
| TW | M632917 U | * | 10/2022 | |
| WO | WO-2020152461 A1 | * | 7/2020 | G02C 1/02 |

OTHER PUBLICATIONS

Easier English Student Dictionary 95 and 584 (2003). (Year: 2003).*
Snap-fit Design Manual (BASF 2007). (Year: 2007).*
Snap-fit Joints for Plastics (Bayer Material Science 2012). (Year: 2012).*
Tessa Axsom, How to Design Snap Fit Components, 2022, pp. 1-16 [online], [retrieved Jan. 1, 2025], retrieved from the Internet <URL: https://www.fictiv.com/articles/how-to-design-snap-fit-components>. (Year: 2022).*

* cited by examiner

SNAP-FIT STRUCTURE FOR SPECTACLE LENS AND TEMPLE

BACKGROUND OF THE PRESENT INVENTION

Field of Invention

The present invention relates to the technical field of eyeglasses, and in particular, to a snap-fit device of spectacle lens and temple.

Description of Related Arts

It is noted that the lens and temple of conventional rimless glasses mainly have the lens punched on the sides thereof, and then the lens and the temple are locked and fixed by screw or rivet pierced through these locking holes of the lens and the temple. However, conventionally, consumers often purchase multiple glasses to replace and wear according to the needs of the occasions, and the purchase of multiple glasses will cause consumers an economic burden. Therefore, if there is a spectacles structure that can facilitate consumers to replace lenses and temples by themselves, it will effectively save consumers the cost of purchasing spectacles.

SUMMARY OF THE PRESENT INVENTION

A main object of the present invention of a snap-fit structure for spectacle lens and temple is to provide a snap-fit structure for spectacle lens and temple, allowing the spectacle lens and the temple to be replaced easily without using any tools.

In order to achieve the above-mentioned objects, the present inventor has developed the following snap-fit structure for spectacle lens and temple, which comprises a spectacle lens with a buckle hole on a side thereof, and a temple with a lens assembly element, wherein a latching member is pivotally connected in a groove of the lens assembly element. In this way, when assembling the spectacle lens and the temple, the side of the spectacle lens is correspondingly engaged with an embedded opening of the lens assembly element, so that the buckle hole of the spectacle lens is extended between an elastic piece and a pressing piece of the latching member, and is coupled with a block of the elastic piece correspondingly. In addition, when separating the spectacle lens from the temple, one may press the pressing piece of the latching member to deflect the latching member at an angle, so that the block of the elastic piece can be separated from the buckle hole of the spectacle lens, and the spectacle lens is separated from the temple. Accordingly, without using any tools, consumers can easily replace and match spectacle lenses of different color shapes and the temples, which attracts the consumers to buy the product and enhances the industrial competitiveness of the present invention and other substantial benefits.

DETAILED DESCRIPTION OF THE PREFERRED EMBODIMENT

Figure 1:
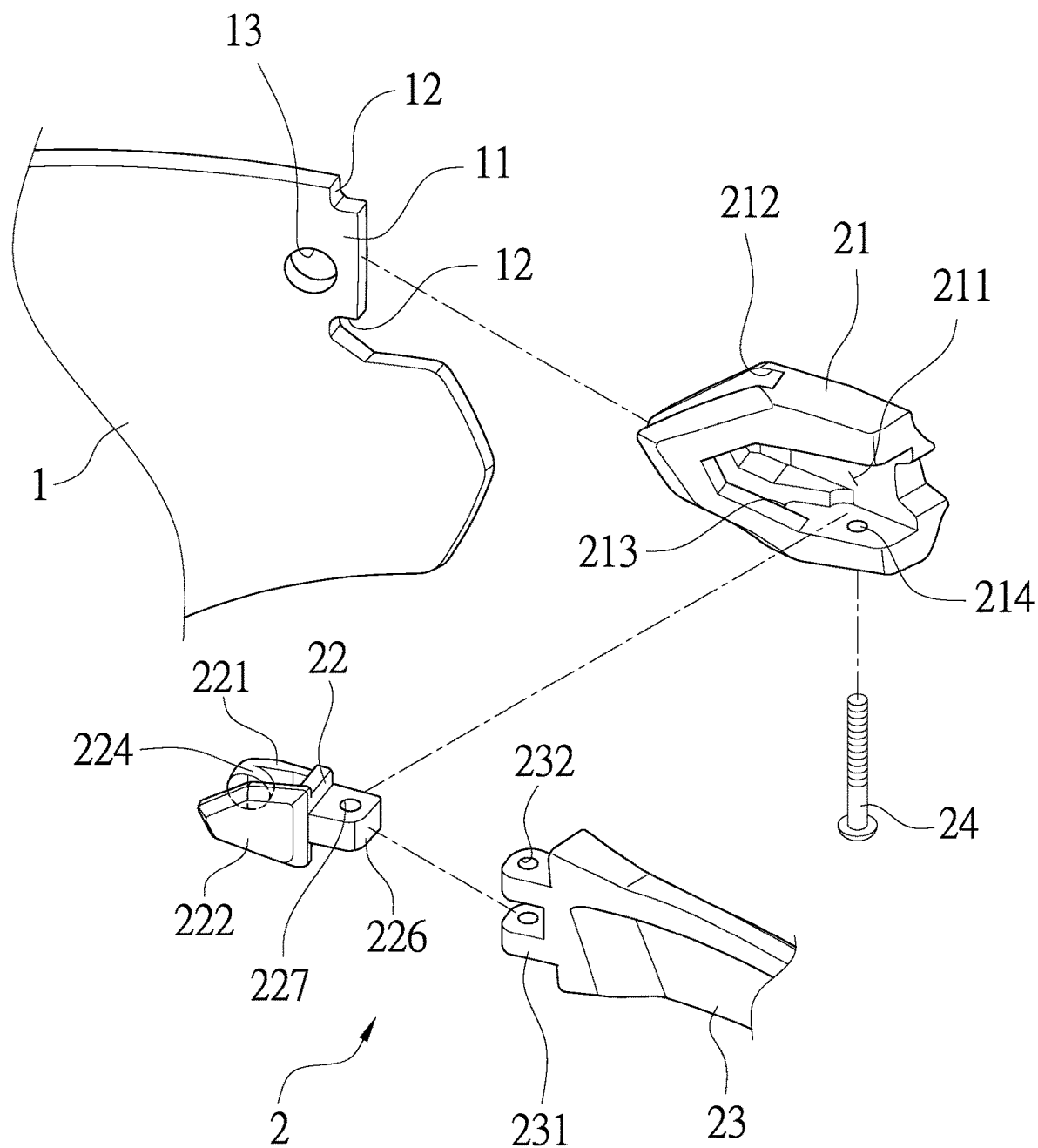
FIG. 1 is an exploded view of the present invention.
Figure 2:
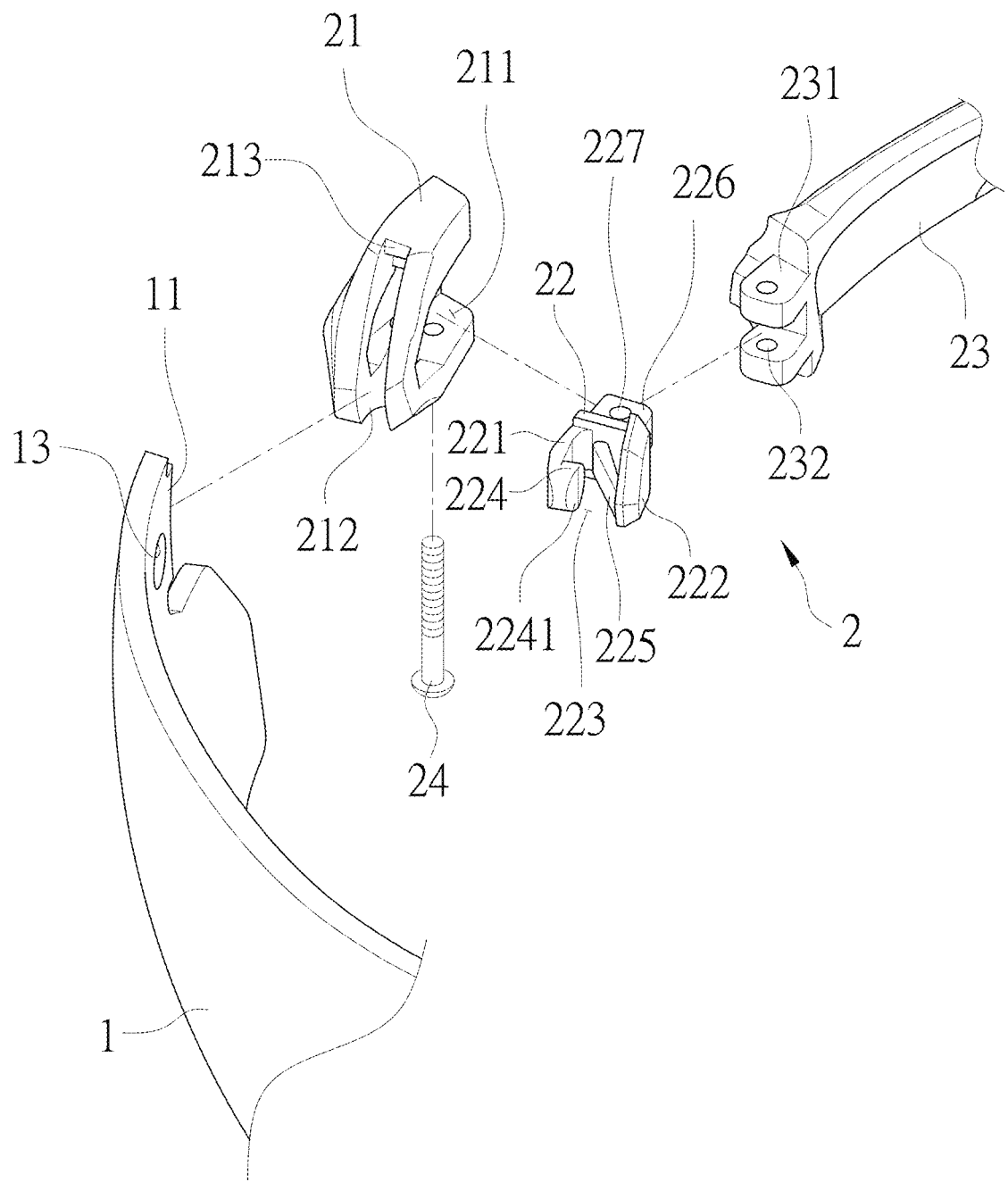
FIG. 2 is another exploded view of the present invention.

First, referring to FIGS. 1 and 2, a snap-fit structure for spectacle lens and temple according to the present invention includes:

a spectacle lens (1), including a temple assembly part (11) arranged at a side thereof, two concave groove-shaped first limiting parts (12) respectively arranged on an upper and a lower sides of the temple assembly part (11) thereof, and a buckle hole (13) arranged on the temple assembly part (11); and a temple (2), comprising a lens assembly element (21), a latching member (22) and a temple main body (23) arranged thereon, wherein the lens assembly element (21) has a first surface and a second surface forming inner and outer opposite faces, wherein the lens assembly element (21) has a groove (211) recessed on the first surface of the inner surface, an embedded opening (212) located at a front side thereof, and two flange-shaped second limiting parts (213) respectively formed on an upper and a lower sides of an end of the embedded opening (212), wherein the end of the embedded opening (212) is extended backward to communicate with the groove (211), wherein the latching member (22) is arranged in the groove (211) of the lens assembly element (21), wherein the latching member (22) has an elastic piece (221) and a pressing piece (222) formed separately on a front section thereof, wherein the elastic piece (221) is adjacent to a groove bottom of the groove (211), wherein the pressing piece (222) is located at a notch of the groove (211), wherein a clamping interval (223) is formed between the elastic piece (221) and the pressing piece (222), corresponding with the position of the embedded opening (212) of the lens assembly element (21), wherein a block (224) is arranged on a side of the elastic piece (221) located in the clamping interval (223), wherein the block (224) has a guide inclined surface (2241) formed on a front edge thereof, wherein an abutting and supporting piece (225) is connected with a side of the pressing piece (222) located in the clamping interval (223), wherein the latching member (22) has a pivot block (226) formed in a rear section thereof, wherein a first pivot hole (227) is arranged on the pivot block (226), wherein the lens assembly element (21) has a second pivot hole (214) arranged at a rear side of the groove (211) and passing through an upper and a lower sides of the groove (211), wherein the temple main body (23) has two separate pivot ears (231) arranged on a front side thereof, wherein each of the two pivot ears (231) has a corresponding third pivot hole (232) arranged thereon, wherein the pivot block (226) of the latching member (22) is arranged between the two pivot ears (231) of the temple main body (23), wherein the first pivot hole (227) of the latching member (22) is corresponding to and aligned with the third pivot hole (232) of the temple main body (23) and the second pivot hole (214) of the lens assembly element (21), wherein a pivot shaft (24) is pivotally connected with the first pivot hole (227), the second pivot hole (214) and the third pivot hole (232) corresponding with the latching member (22), the lens assembly element (21) and the temple main body (23).

Figure 3:
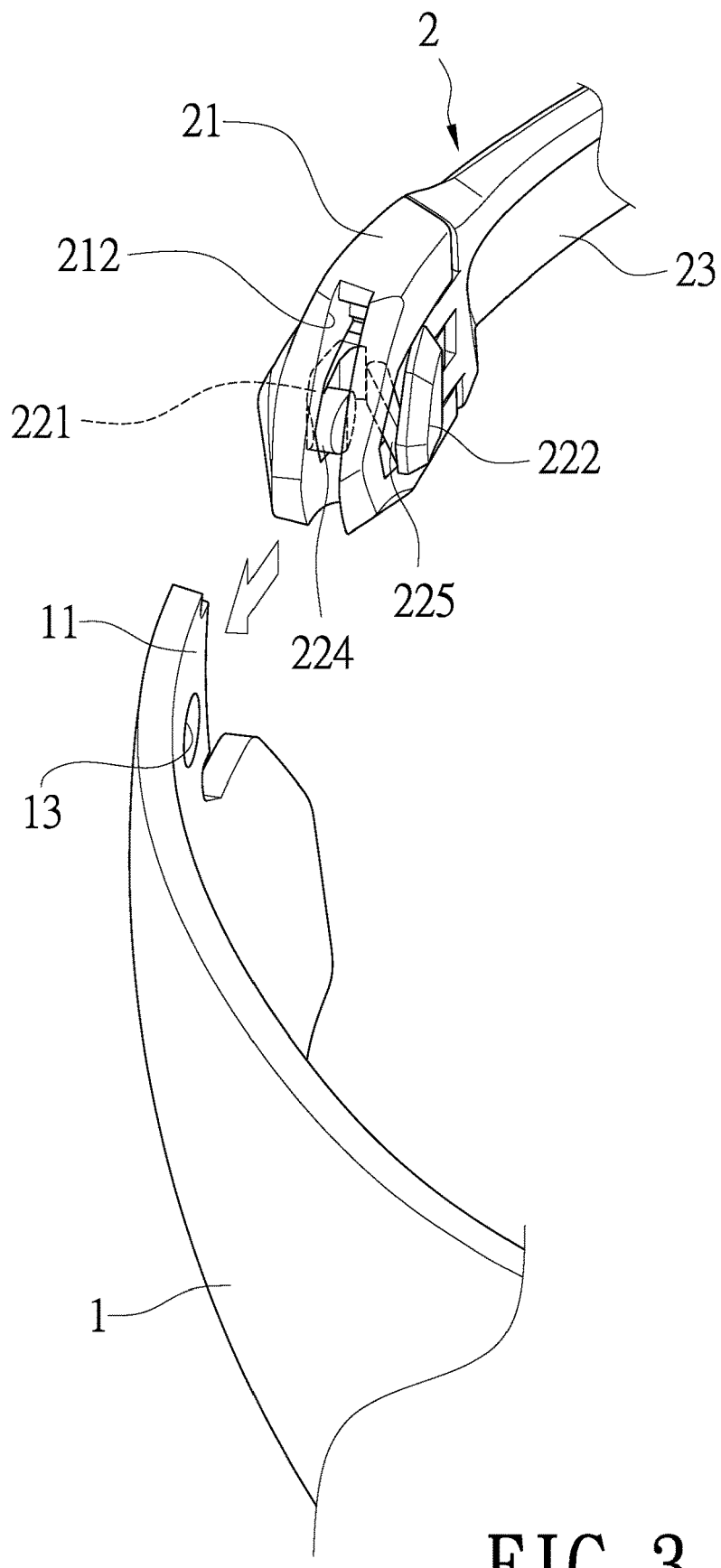
FIG. 3 is an exploded view of the present invention in a use state.
Figure 4:
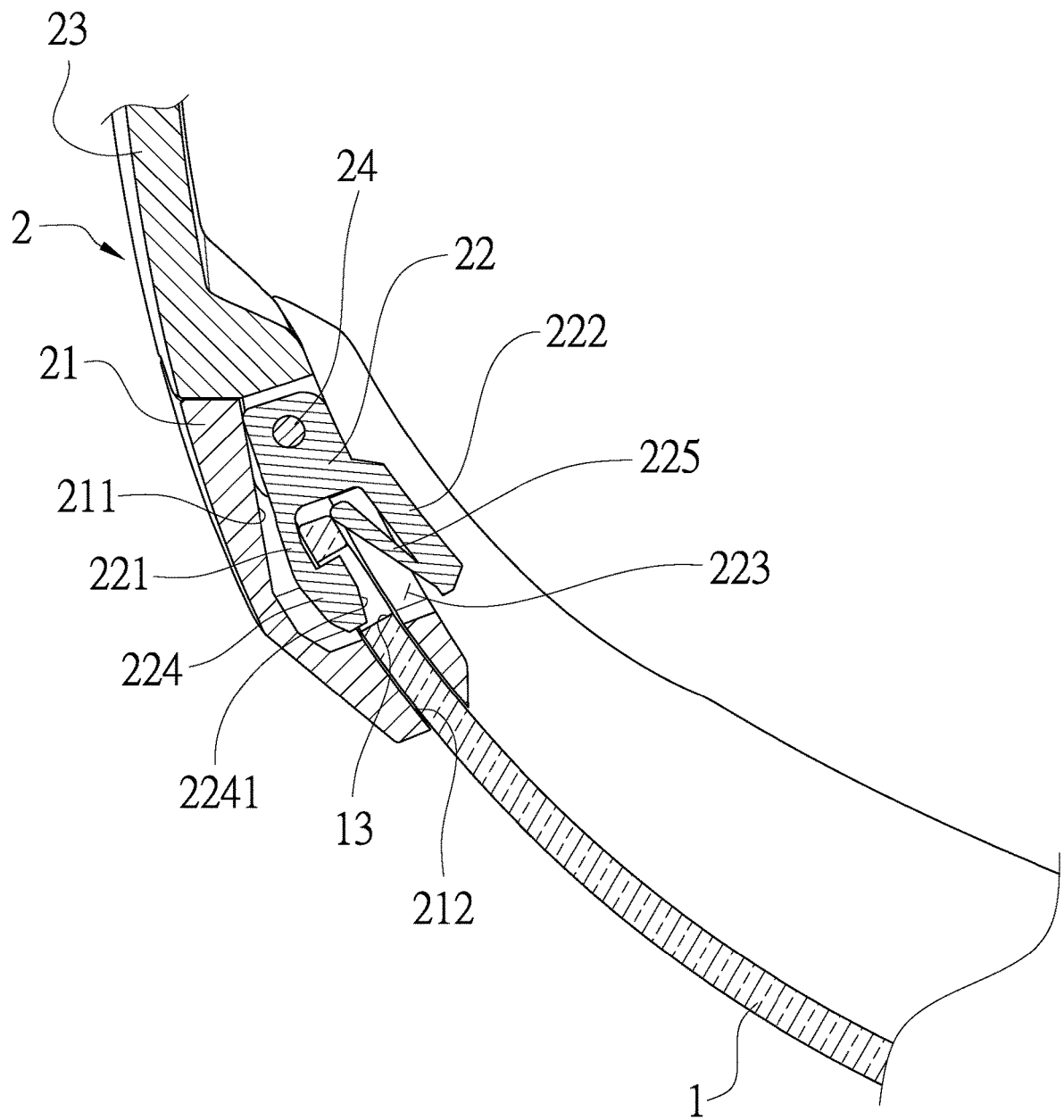
FIG. 4 is a sectional view of the present invention in the use state.

Accordingly, referring to FIGS. 3 and 4, when assembling the spectacle lens (1) and the temple (2), the temple assembly part (11) provided on the side of the spectacle lens (1) is correspondingly joined with the embedded opening (212) of the lens assembly element (21) of the temple (2), and the concave groove-shaped first limiting parts (12) on the upper and lower sides of the temple assembly part (11) of the spectacle lens (1) are respectively positioned against the flange-shaped second limiting parts (213) on the upper and lower sides of the end of the embedded opening (212) of the lens assembly element (21), wherein at this time, the temple assembly part (11) of the spectacle lens (1) is extended into the clamping interval (223) of the latching member (22), and is guided along the guide inclined surface (2241) on the front edge of the block (224) of the elastic piece (221) of the latching member (22) to push the elastic piece (221) towards the groove bottom of the groove (211), wherein when the buckle hole (13) of the temple assembly part (11) of the spectacle lens (1) moves to the block (224), the elastic piece (221) is reset by the elasticity thereof, so that the block (224) of the elastic piece (221) is coupled with the corresponding buckle hole (13) of the spectacle lens (1), wherein the abutting and supporting piece (225) connected with the pressing piece (222) is pressed against the temple assembly part (11) of the spectacle lens (1) to clamp the opposite two sides of the temple assembly part (11) of the spectacle lens (1) together with the elastic piece (221), so that the block (224) of the elastic piece (221) is stably snapped with the buckle hole (13) of the spectacle lens (1), wherein the pressing piece (222) also allows the abutting and supporting piece (225) to reversely push and protrude the notch of the groove (211) of the lens assembly element (21).

Figure 5:
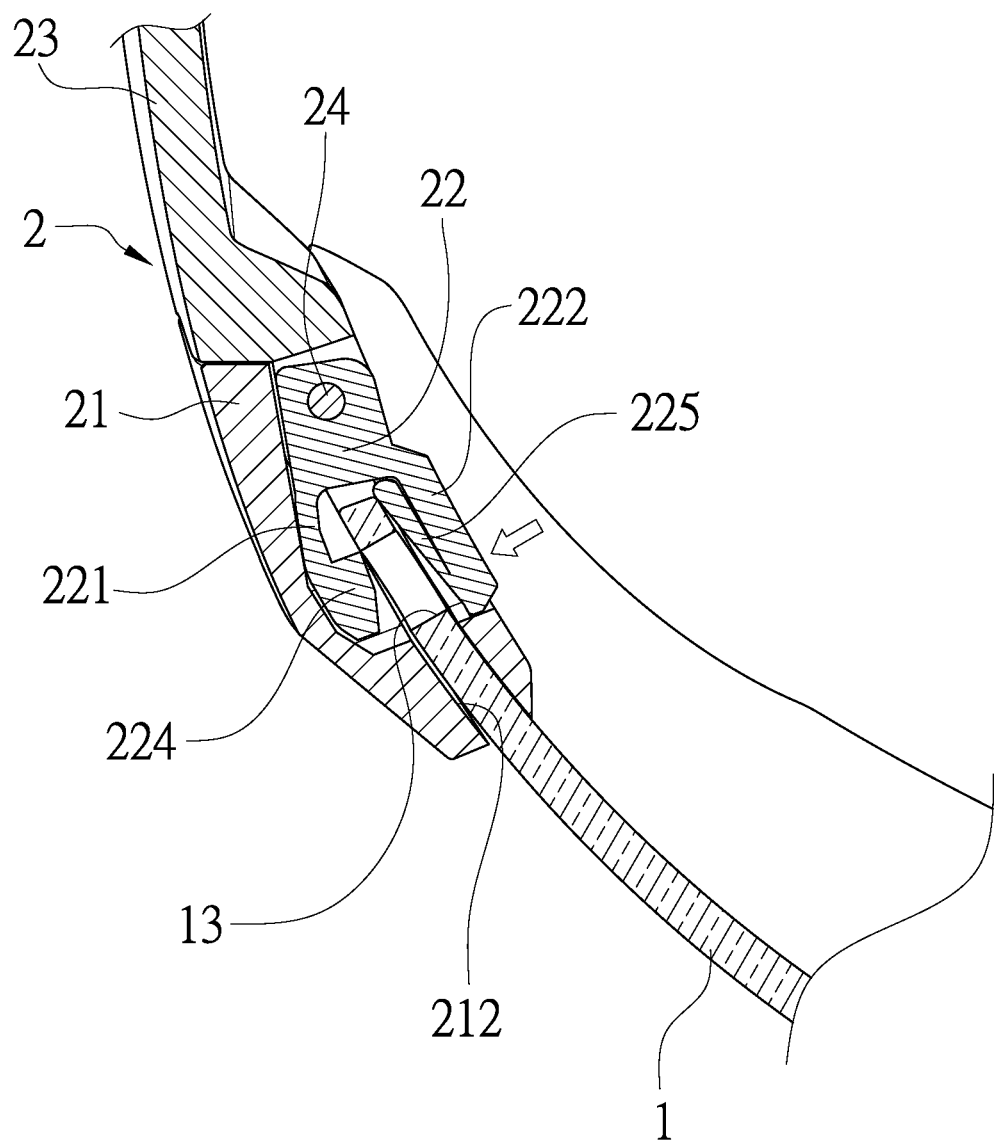
FIG. 5 is a sectional view of the present invention in another use state.

In addition, refer to FIG. 5, when the user intends to separate the spectacle lens (1) from the temple (2), s/he may act a force on the pressing piece (222) provided on the latching member (22) of the temple (2), so the latching member (22) is pivoted to the pivot shaft (24) as a rotation point to push the latching member (22) toward the groove bottom of the groove (211), so that the latching member (22) is deflected at an angle. At this moment, the block (224) provided by the elastic piece (221) of the latching member (22) is out of a snap-fit state of the buckle hole (13) of the temple assembly part (11) of the spectacle lens (1), and then the temple assembly part (11) of the spectacle lens (1) is allowed to be pulled out from the embedded opening (212) of the lens assembly element (21), so that the spectacle lens (1) can be separated from the temple (2).

Thereby, utilizing the structural form of the present invention, the spectacle lens (1) and the temple (2) can be easily replaced. In addition, during the replacement process of the spectacle lens (1) and the temple (2), no tools are required at all, so that the effects of saving spectacle assembly time and increasing assembly efficiency are achieved. Furthermore, the consumers only need to purchase a pair of spectacle lenses (1) and are allowed to match them with multiple pairs of temples (2) with different colors and patterns according to their personal preferences, to assemble spectacles modeling suitable for their activities. In this way, the economic expenditure of the consumers to purchase multiple pairs of spectacles can be saved, and at the same time, the inconvenience of storing multiple pairs of spectacles and the waste of resources when the spectacles are not in use can also be avoided. In addition, for the eyewear industry, the structural form of the present invention not only saves time for eyeglass assembly, but also avoids losses such as damage to the spectacle lens (1) caused by excessive locking force on the spectacle lens (1) during the assembly process. At the same time, since the present invention allows the consumers to change the spectacle lens (1) and the temple (2) by themselves, the consumers may match them and produce personalized and beautiful glasses. Thereby, the consumers will be further attracted to purchase the products, which brings substantial benefits such as enhancing the market competitiveness of the present invention.

The aforementioned embodiments or drawings shall not limit the implementation of the snap-fit structure for spectacle lens and temple of the present invention. In the present invention, the latching member (22) and the temple main body (23) may not only be pivotally connected with the lens assembly element (21) through a pivot shaft (24) penetration, but the rear section of the latching member (22) and the front side of the temple main body (23) may also be respectively pivotally connected with the lens assembly element (21). In addition, the latching member (22) of the present invention can also omit the setting of the abutting and supporting piece (225), so that the distance between the clamping interval (223) of the latching member (22) is just enough for the elastic piece (221) and the pressing piece (222) to respectively abut against the two opposite sides of the temple assembly part (11) of the spectacle lens (1), so that the block (224) can also be stably snapped together with the buckle hole (13) of the spectacle lens (1). Any appropriate changes or modifications made by those with ordinary knowledge in the technical field should be regarded as not departing from the patent scope of the present invention.

It can be seen according to the above-mentioned structure and embodiments that advantages and effects provided by the present invention include the following:

1. In the snap-fit structure for spectacle lens and temple of the present invention, the buckle hole is provided on the side of the spectacle lens, and the latching member is provided in the lens assembly element of the temple to be coupled with the buckle hole of the spectacle lens correspondingly. When dismantling the spectacle lens and the temple, one only needs to press the latching member to make the block of the elastic piece leave from the buckle hole of the spectacle lens, which allows the coupling of the spectacle lens and the temple to be dismissed. Therefore, the spectacle lens and the temple of the present invention are very easy to assemble and disassemble, which allows the users to replace different lenses and temples by themselves according to their needs of styling and dressing.

2. In the snap-fit structure for spectacle lens and temple of the present invention, the buckle hole is provided on the side of the spectacle lens, and the block is provided on the latching member of the lens assembly element of the temple to correspond to the buckle hole of the spectacle lens. The simple spectacle lens and temple assembly structure can prevent the conventional drawback of using screws or rivets to assemble the lens and temples, which are prone to the inconvenience of screw loosening or the need to use special equipment to assemble and disassemble the rivets. It can also avoid the spectacle lens damage and other losses caused by excessive locking force on the spectacle lens during the assembly process.

3. The snap-fit structure for spectacle lens and temple of the present invention does not require any tools during assembly and disassembly, so it is convenient for the consumers to replace the spectacle lenses with the temples of different colors and shapes according to their own needs. In this way, consumers can save the financial burden of purchasing multiple pairs of spectacles, and at the same time avoid the trouble of storing multiple pairs of spectacles, and the waste of material resources caused by multiple pairs of spectacles being idle when not in use.

4. The snap-fit structure for spectacle lens and temple of the present invention can facilitate the assembly of spectacle lenses and temples of different colors and shapes for the consumers to match and create personalized and beautiful glasses. Accordingly, it attracts the consumers to buy these products, and then enhances the industrial competitiveness of the present invention and other substantial benefits.

What is claimed is:

1. A snap-fit structure for spectacle lens and temple, comprising:
   a spectacle lens including a temple assembly part formed at at least one of two opposing sides thereof, and the spectacle lens being formed with a buckle hole at the temple assembly part, wherein the buckle hole is formed as a through hole having a closed perimeter; and
   a temple including a lens assembly element, a latching member, and a temple main body;
   wherein the lens assembly element is a one-piece formed structure and includes a first surface and a second surface formed opposite to the first surface, wherein a groove is formed by being recessed on the first surface of the lens assembly element and an embedded opening is formed and disposed at a front side of the lens assembly element, wherein two opposing ends of the embedded opening are in communication with the groove;
   wherein the latching member is a one-piece formed structure and is disposed in the groove of the lens assembly element, wherein an elastic piece and a pressing piece extend from two opposing sides of the latching member at a front section thereof and are fixedly attached thereto, wherein the elastic piece is disposed substantially adjacent to a bottom section of the groove and is formed as a flat surface, wherein the pressing piece is disposed at an opened notch section of the groove, wherein a clamping interval is formed between the elastic piece and the pressing piece whereby a section of the clamping interval is corresponding in position with the embedded opening of the lens assembly element, and wherein a block extends from a side of the elastic piece towards the pressing piece to be located in the clamping interval;
   wherein the temple assembly part of the spectacle lens is selectively and correspondingly engaged with the embedded opening of the lens assembly element for extending into the clamping interval of the latching member, wherein the buckle hole of the temple assembly part of the spectacle lens is snapped and resiliently coupled with the block extending from the elastic piece of the latching member, wherein the temple assembly part is also laterally clamped within the clamping interval by opposing sidewalls of the elastic piece and the pressing piece, and wherein a rear section of the latching member and a front portion of the temple main body are pivotally connected with the lens assembly element.

2. The snap-fit structure for spectacle lens and temple as claimed in claim 1, wherein a guide inclined surface is formed on a front edge of the block extending from the elastic piece of the latching member.

3. The snap-fit structure for spectacle lens and temple as claimed in claim 1, wherein abutting-and-supporting piece is connectedly formed with the sidewall of the pressing piece for being disposed in the clamping interval, wherein the abutting-and-supporting piece is configured to press against the temple assembly part of the spectacle lens.

4. The snap-fit structure for spectacle lens and temple as claimed in claim 1, wherein a pivot block is formed at a rear section of the latching member, wherein the pivot block has a first pivot hole arranged thereon, wherein a second pivot hole is arranged at a rear side of the groove of the lens assembly element for passing through upper and lower portions of the groove, wherein two pivot ears are separately arranged on a front side of the temple main body, wherein each of the two pivot ears has a corresponding third pivot hole arranged thereon, wherein the pivot block of the latching member is arranged between the two pivot ears of the temple main body, wherein the first pivot hole of the latching member corresponds and aligns with the third pivot hole of each of the two pivot ears of the temple main body and the second pivot hole of the lens assembly element, wherein a pivot shaft is pivotally connected with the first pivot hole, the second pivot hole, and the third pivot hole of each of the two pivot ears, corresponding with the latching member, the lens assembly element, and the temple main body.

5. The snap-fit structure for spectacle lens and temple as claimed in claim 1, wherein two concave groove-shaped first limiting parts are, respectively, formed on an upper portion and a lower portion of the temple assembly part, wherein two flange-shaped second limiting parts are, respectively, formed on an upper end portion and a lower end portion of the opposing ends of the embedded opening for abutting against and thereby positioning the two flange-shaped second limiting parts on a corresponding one of the upper and lower portions of the temple assembly part of the spectacle lens, respectively.

* * * * *